(12) United States Patent
Tappermann et al.

(10) Patent No.: US 7,508,447 B2
(45) Date of Patent: Mar. 24, 2009

(54) VIDEO SIGNAL PROCESSING FOR CONVERTING MODIFIED VIDEO SIGNALS BETWEEN FORMATS

(75) Inventors: Jörg Tappermann, Stuttgart (DE); Alexander Scholz, Stuttgart (DE); Gil Golov, Backnang (DE); Alfried Dilly, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 671 days.

(21) Appl. No.: 11/034,280

(22) Filed: Jan. 12, 2005

(65) Prior Publication Data
US 2005/0185091 A1    Aug. 25, 2005

(30) Foreign Application Priority Data
Jan. 13, 2004  (EP)  .................. 04000556

(51) Int. Cl.
*H04N 7/01* (2006.01)
*H04N 11/20* (2006.01)

(52) U.S. Cl. ..................... 348/441; 348/443
(58) Field of Classification Search ................ 348/443, 348/441, 458, 459, 581, 14.12; 345/603
See application file for complete search history.

(56) References Cited

U.S. PATENT DOCUMENTS

| | | | | |
|---|---|---|---|---|
| 5,117,289 A | * | 5/1992 | Farley et al. ................. | 348/443 |
| 5,272,520 A | * | 12/1993 | Kanoh et al. ................. | 348/453 |
| 5,353,119 A | * | 10/1994 | Dorricott et al. ............. | 348/446 |
| 5,453,792 A | * | 9/1995 | Gifford et al. ............... | 348/441 |
| 5,990,982 A | | 11/1999 | Gove et al. | |
| 6,124,881 A | * | 9/2000 | Terui et al. ................. | 348/14.09 |
| 6,144,412 A | * | 11/2000 | Hirano et al. ................ | 348/441 |

(Continued)

FOREIGN PATENT DOCUMENTS
EP    1 370 090    12/2003

*Primary Examiner*—Victor R Kostak
(74) *Attorney, Agent, or Firm*—Oblon, Spivak, McClelland, Maier & Neustadt, P.C.

(57) ABSTRACT

The design of a video processing core designed for processing video signals of a specific video format requires a high expense. It is therefore desirable to be able to use such a video processing core for other video formats as well. The invention therefore provides the method for video signal processing, wherein the following steps are performed: receiving an input video signal (1) having a first or input format (INOUT, NTSC; INOUT, PAL), processing said input video signal (1) or a modified video signal (2), which is a derivative of said input video signal (1), using a video signal processing method, which is designed for processing video signals of a fixed second or processing format (PAL; NTSC) thus generating a processed video signal (3), outputting said processed video signal (3) or a derivative thereof as an output video signal (4), wherein said modified video signal (2) is derived from said input video signal (1) by adding or removing pixels to/from said input video signal (1), thereby obtaining said modified video signal (2) with an intermediate format (PROC), if said first or input format (INOUT, NTSC; INOUT, PAL) is not conform to said fixed or processing second format, wherein said output video signal (4) is derived from said processed video signal (3) by accordingly removing or adding pixels from/to said processed video signal (3) thereby obtaining an output video signal (4) of said first format, if said first or input format (INOUT, NTSC; INOUT, PAL) is not conform to said second or processing format (PAL; NTSC).

33 Claims, 4 Drawing Sheets

U.S. PATENT DOCUMENTS

| | | | |
|---|---|---|---|
| 6,407,775 B1 * | 6/2002 | Frink et al. | 348/443 |
| 6,560,280 B1 * | 5/2003 | Shachar et al. | 375/240 |
| 7,012,648 B2 * | 3/2006 | Kondo et al. | 348/441 |
| 7,064,790 B1 * | 6/2006 | Varma et al. | 348/441 |
| 7,202,911 B2 * | 4/2007 | Brelay | 348/561 |

* cited by examiner

VIDEO SIGNAL PROCESSING FOR CONVERTING MODIFIED VIDEO SIGNALS BETWEEN FORMATS

BACKGROUND

The invention relates to a method for video signal processing.

It is a complex task to implement video signal processing algorithms in hardware. Such hardware is typically referred to as video processing core. During the design process of a video processing core evaluation and verification are very important steps. Developing a video processing core, i.e. a core processing module for a single video format, e.g. PAL format or NTSC format, represents the lowest requirement and thus a fast and controllable design effort. Maintaining this single format design environment is desirable. It has to be noted that the format names "PAL" and "NTSC" throughout this description only denote the number of pixels per video line, the number of video lines per field and the field rate common to these formats as specified in the digital video format ITU-R 656. The names originate from the analogue format specifications and specify more parameters, such as colour coding, modulation schemes, and so on. But throughout this description only the mentioned parameters pixels per line, lines per field and fields per second will be referenced.

In other words, it is desirable to be able to use a video processing core designed for a specific video format for other video formats as well.

For this purpose, in prior art, a video signal of an input format that is different from the processing format of the processing core, i.e. the format the processing core is designed for, is completely converted into a video signal having said processing format. However, such a complete conversion has several disadvantages, e.g. the longer time needed for format conversion, additional needed hardware, as well as a differing temporal base for fields which influences motion rendering. Also, large memories and logic functions are needed to perform a full format conversion process.

SUMMARY

It is an object underlying the invention to provide a method for video signal processing which enables the use of a video processing method designed for a specific processing format for processing a video signal having an input format which can be different from the processing format with very little expense.

To achieve this objective, the invention provides a method for video signal processing according to claim 1. In addition, the invention provides a signal processing system, a computer program product, and a computer readable storage medium as defined in claims 28, 32 and 33, respectively. Further features and preferred embodiments are respectively defined in respective sub claims and/or in the following description.

Within the inventive method for video signal processing, the following steps are performed: receiving an input video signal having a first or input format, processing said input video signal or a modified video signal, which is a derivative of said input video signal, using a video signal processing method, which is designed for processing video signals of a fixed second or processing format thus generating a processed video signal, outputting said processed video signal or a derivative thereof as an output video signal, wherein said modified video signal is derived from said input video signal by adding or removing pixels to/from said input video signal, thereby obtaining said modified video signal with an intermediate format, if said first or input format is not conform to said fixed second or processing format, wherein said output video signal is derived from said processed video signal by accordingly removing or adding pixels from/to said processed video signal thereby obtaining an output video signal of said first format, if said first or input format is not conform to said second or processing format.

Thereby, said video signal processing method is designed to work on a specific line width determined by the processing format, i.e. the core format. According to the invention the INOUT format line length, i.e. the format line length of the input video signal is changed in order to match the processing format line length, i.e. the format line length of the processing format. Further, the number of lines per video field to be processed by the video signal processing method, which may be performed by the core, i.e. the video processing core, is determined by a respective field restart signal, i.e. video synch signal, and not by the core format line number, i.e. the number of lines of the core format, i.e. the processing format.

For example, a PAL processing core can be interrupted and restarted before reaching 312 lines, whereas an NTSC processing core can process more than 262 lines. It should be noted, that the pixel rate of the INOUT format is identical to the pixel rate of the PROC format. Note, that the invention is also applicable with differing pixel rates. In this case only the sizes of the buffers need to be increased (for the use of buffers see below).

An aspect of the invention is therefore to add or remove pixels to/from said input video signal, such that the resulting video signal, i.e. said modified video signal, has the processing line length, i.e. the number of pixels per line of the processing format of the video processing core.

According to the invention said intermediate format may not be a valid standard video format, in particular it may neither be of the first or input format nor of the fixed second or processing format. This means, no format conversion process in the classical sense of the term is performed. Those skilled in the art will notice the difference. The modified video signal is therefore not conform with any valid standard video format, e.g. PAL standard or NTSC standard. It should be clearly understood at this point, that the intention of the invention is not to do format conversion.

In a first embodiment (cf. below) it is the target of the invention to add NTSC signal processing capability to a signal processing core unit, i.e. above mentioned video processing core, which was originally designed for processing PAL video signals. This, however, does not mean that internally the NTSC signal is converted to a valid PAL format. Instead, the NTSC signal is internally handled the same as the PAL signal. Therefore, additional video information is stored in extra memory space (cf. below). As the NTSC format compared to the PAL format contains more video fields and less video lines per field, the video processing in the core module is prematurely interrupted and restarted more often than during PAL processing. This means, there are different control state machines needed for PAL and NTSC processing, as the field restart signals of the processing core module are different for PAL and NTSC. The internal core processing signal used in the NTSC mode is just similar to PAL, but not a valid PAL format. As already mentioned, a processing core which was originally designed for PAL video signals only is used. According to the invention, the processing capability is extended to NTSC signal by adding some additional memory space and additional control logic, cf. first embodiment below. Again, format conversion from PAL to NTSC standard and vice versa is not possible with the invention. A PAL input produces a PAL output according to the first embodiment below, and an NTSC input produces an NTSC output as is the case for a second embodiment below. A benefit of the invention is the easy adaptation of an existing and tested PAL system processing core to NTSC format (cf. first embodiment below) or vice versa (cf. second embodiment below).

According to the invention, the number of lines of said intermediate format is equal to the number of pixels per video field of said first or input format divided by the number of pixels per video line of said second or processing format. As mentioned, the invention is based on the assumption of an equal number of processed pixels per time instance, i.e. an equal pixel rate for both formats, i.e. the input format and the processing format. But as mentioned above, a differing input and output pixel rate compared to the core processing pixel rate is possible but not further considered throughout the remainder of this description.

In said first embodiment the source format NTSC has 858 pixels per line and 263 lines per field for a long field, which equals 225654 pixels per field. The core processing format in this first embodiment is the PAL format and has 864 pixels per line. This means, the number of lines of said intermediate format is given by 225654/864=261.1 lines. This includes all required 244 lines of active video in NTSC format.

In the second embodiment the input video signal is a PAL format signal and the processing core format is the NTSC format. In this case 864 pixels per line and 313 lines per field, i.e. per long field, which equals 270432 pixels per field need to be processed by the NTSC core. In this case, the number of lines of said intermediate format equals 270432/858=315.1 lines. These are actually more lines than the NTSC format specifies. Thus, the processing core must not be limited in the number of lines to be processed between successive input fields. It should be noted at this point, that the temporal field rate and the number of lines per field are interchangeable parameters in the respective format. With an equal field rate for both formats, wider lines mean fewer lines per field or vice versa. Also, with an equal number of lines per field for both formats, wider lines mean a lower field rate, respectively.

According to the invention, said first or input format is preferably a first standard video format, e.g. NTSC-/PAL-format, and/or said fixed second or processing format is a second standard video format, e.g. PAL-/NTSC-format. In the first embodiment of the invention, said first standard video format is the NTSC format and said second standard video format is the PAL format.

Preferably, when deriving said modified video signal from said input video signal pixels are added/removed so as to change the number of pixels per video line of said intermediate format with respect to said first or input format. Thereby, no other modifications of the input video signal are performed, only pixels are added or removed. Therefore only very little expense is needed.

Preferably, pixels are added/removed to/from said input video signal such that the number of pixels per video line of said intermediate format is equal to the number of pixels per video line of said fixed second or processing format. As mentioned above, this is because a processing core is designed to work on a specific line width which is determined by the core format i.e. the processing format. In the first embodiment six pixels per line are added so as to change the number of pixels per line of the input video signal which is an NTSC signal and therefore has 858 pixels per line to 864 pixels per line, which is conform with the processing format, which is the PAL format.

Preferably, when deriving said output video signal from said processed video signal said pixels are removed/added so as to change the number of pixels per video line of said output video signal with respect to said processed video signal.

In particular, pixels are removed/added from/to said processed video signal such that the number of pixels per video line of said output video signal is equal to the number of pixels per video line of said first or input format. For example, in the first embodiment 6 pixels per line are removed from the processed video signal, thus generating an output video signal of the NTSC format.

Further, said video signal processing method preferably uses the field restart signal of said input video signal, such that the field processing rate of said processing method is equal to the field rate of the first or input format. This means, processing is done field-wise and the processing of a video field is governed by the field restart signal of the input video signal. It should be noted in this context, that this means that the field processing rate of the video processing core is determined by the field rate of the input video signal. A field restart, i.e. a field restart signal is a certain trigger condition derived from the embedded synch signals or internally generated synch signals. E.g., the beginning of the first active video line in a field can be a field restart pulse. The actual restart condition is arbitrary and depends on the implementation. It only has to be the same condition for all fields, whether coming in from external or being generated internally as a result of a video data processing step. In general, a field restart signal indicates a start condition, which occurs only once per video field, preferably at the beginning of a field.

As already mentioned, said video processing is preferably performed by a video processing core, which is in particular adapted/designed for said fixed second or processing format, i.e. the video processing core is adapted/designed for processing video signals of said fixed second or processing format. The invention enables the use of this video processing core together with an input video signal of a different format than the processing format, i.e. the first or input format. Thereby, no changes are necessary within the video processing core.

FIRST EMBODIMENT

In the first embodiment said first or input format is the NTSC standard video format and said second or processing format is the PAL standard video format.

In this first embodiment preferably blank pixels are added at the end of an input video signal line, thus obtaining said modified video signal having said intermediate format. Blank pixels may be seen as pixels that do not contain any information.

Also, in this first embodiment pixels of said input video signal are preferably stored in a first buffer and said processing method reads pixels from said first buffer. This first buffer can be referred to as an expansion buffer or slow-down buffer, as it is used to extend the line width of the input video signal to match the line width of the second or processing format. Pixels of the input video signal are stored, i.e. written to said first buffer at the same time the video processing core reads pixels from the first buffer. After one video line of said input video signal has been written to the buffer and due to the same pixel rate of the video processing core has been processed, pixels are added, i.e. 6 pixels, which will be processed by the video processing core subsequently. While processing these added pixels further pixels of the input video signal arrive and are stored in said first buffer. The buffer may be seen as a First-In-First-Out (FIFO) buffer. Also, the input video signal may be regarded as an input video stream consisting of pixels that are written to the first buffer. At the output of the first buffer, pixels are added into the input video stream after the end of a video line of the input video stream. These pixels are also processed by the processing core and subsequently arriving pixels of the input video stream are stored in the expansion buffer during the processing of the added pixels by the video processing core. This way said first buffer will continually fill up during the processing of one video field, i.e. because of the unequal write/read ratio to/from said first buffer.

Preferably, processed pixels of said processed video signal which correspond to added pixels of said modified video signal are removed from said processed video signal, thus obtaining said output video signal. In other words, the blank pixels that have been added at the end of each input video signal line and that have been processed by the processing method are removed. This means, no special care must be taken by the video processing core when processing the blank pixels as the processing pixels are removed after the processing. The blank pixels should be of values such, that the processing core will not be disturbed or interrupted. Repetition of the last valid source pixel value could be a preferred method to derive a suitable blank pixel value.

Advantageously, pixels of said processed video signal are stored in a second buffer and said output video signal is generated by reading pixels from said second buffer. This second buffer may be referred to as compression buffer or speed-up buffer, as it is used for removing processed blank pixels. The second buffer may also be regarded as a FIFO-buffer, wherein the video processing core writes processed pixels to said second buffer which are then output on a FIFO-basis, thus generating said output video signal. Only IO-pixels will be written. The blank pixels will be omitted from writing into the FIFO-buffer, as they will be discarded anyways.

Preferably, a first buffer and/or a second buffer are used having a capacity to at least store a minimum number of pixels, which is determined by the number of added pixels per video field of said input video signal. The needed maximum buffer capacity will be computed later. It depends also on whether only active video is stored or an entire video line (see below).

Reading of pixels from said second buffer does not start until said second buffer is filled with at least said minimum number of pixels. The functioning of the second buffer can be better understood with the following elucidations: In the first embodiment on the output side of the processing core, the PAL signal has to be reformatted to match the first or input format, i.e. the NTSC format. Writing into the compression buffer starts as soon as the processing module provides valid data, i.e. processed video pixels. When the compression buffer is filled with said minimum number of pixels, reading starts with a higher rate. It can be advantageous to dimension the buffer such that the maximum number of pixels that can be stored in the buffer is equal to said minimum number of pixels. In this case reading starts with the higher rate when the compression buffer is completely filled up. In the first embodiment for every 864 pixels written, 858 pixels are read, and 6 pixels are discarded. When the entire buffer is empty, the NTSC field has been written out. This concludes one full cycle, i.e. one processed video field.

SECOND EMBODIMENT

In the second embodiment of the invention said first or input format is the PAL standard video format and said second or processing format is the NTSC standard video format.

In this second embodiment pixels are preferably removed at the end of an input video signal thus obtaining said modified video signal having said intermediate format. The pixels that are removed are pixels corresponding to Hblank and/or Vblank data. In other words, no pixels corresponding to active video data are removed.

Preferably, pixels to be removed correspond to pixels of the horizontal blanking period. However, this depends on the possibly embedded auxiliary data contained in the Hblank data. A person skilled in the art will know which data can be safely skipped, i.e. removed.

Preferably, pixels of said input video signal are stored in a second buffer and said processing method reads pixels from said second buffer. This second buffer may be referred to as a compression buffer or speed-up buffer as pixels are skipped from the input video signal. It should be noted that reading from the compression buffer does not start until sufficient data, which correspond to the number of pixels that will be skipped during the processing of one video field, are in the compression buffer. It has to be noted that pixels to be skipped will not be written to the buffer.

Further, in this second embodiment blank pixels are added at the end of each video line of said processed video signal, thus obtaining said output video signal of said first or input format. This method is equal to the input stage of the first embodiment. Added blank pixels must not disturb the outgoing video stream, e.g. by adding synch patterns.

Also, in this second embodiment pixels of said processed video signal are stored in a first buffer and said output video signal is generated by reading pixels from said first buffer. This first buffer may be referred to as expansion buffer or slow-down buffer because it is used to store pixels that arrive from the video processing core during the time blank pixels are added at the output of said first buffer.

Advantageously, a second buffer and/or a first buffer are used having a capacity to at least store a minimum number of pixels, which is equal to the number of pixels removed from said input video signal per video field.

Preferably, said processing method does not start reading pixels from said second buffer until said second buffer is filled with at least a minimum number of pixels. This way, at the end of the processing of one video, the compression buffer will be empty.

Also, said processing method may not start reading pixels from said second buffer until a field restart read signal is provided.

A signal processing system according to the invention is capable of performing or realizing a method for video signal processing as defined above and/or the steps thereof.

The inventive signal processing system preferably comprises a receiving means adapted for receiving an input video signal, an adding/subtracting means adapted for adding/subtracting pixels to/from said input video signal thus generating a modified video signal having an intermediate format, a processing means designed for processing video signals of a fixed second or processing format, which processing means is adapted for processing said modified video signal, and thus generating a processed video signal, a subtracting/adding means adapted for subtracting/adding pixels from/to said processed video signal thus generating an output video signal of said first format, and an outputting means adapted for outputting said output video signal. It should be noted that "designed for" here means that the purpose or destiny of the processing means, e.g. a hardware video processing core, is to process video signals of said fixed second or processing format. Without the invention, it is not possible to use said processing means for processing video signals of a format that is different from said fixed second or processing format. As mentioned, the design of a processing means in hardware requires a high expense. With the invention, a once designed hardware processing core for a fixed second or processing format can be used without any modifications for processing video signals of a different format than said fixed second or processing format.

The inventive signal processing system further preferably comprises at least one storage means adapted for storing at least parts of said input video signal and/or at least parts of said processed video signal. Writing to and reading from said at least one storage means is thereby preferably controlled by respective synchronization signals, i.e. synch signals, that are contained within said input video signal, said modified video signal, said processed video signal, and/or said output video signal.

The inventive signal processing system advantageously comprises at least one synch conversion module adapted for detecting a synch signal in said input video signal and/or said processed video signal, and providing a field restart signal to said storage means wherein said storage means is adapted for receiving said field restart signal, and using said field restart signal for controlling reading and/or writing from/to said storage means.

A computer program product according to the invention comprises computer program means adapted to perform and/or to realize the method of video signal processing as defined above and/or the steps thereof when it is executed on a computer, a digital signal processing means, and/or the like.

An inventive computer readable storage medium comprises a computer program product as defined above.

The invention and advantageous details thereof will be explained by way of an exemplary embodiment thereof in the following with reference to the accompanying drawings, in which

BRIEF DESCRIPTION

DETAILED DESCRIPTION OF THE INVENTION

Figure 1:
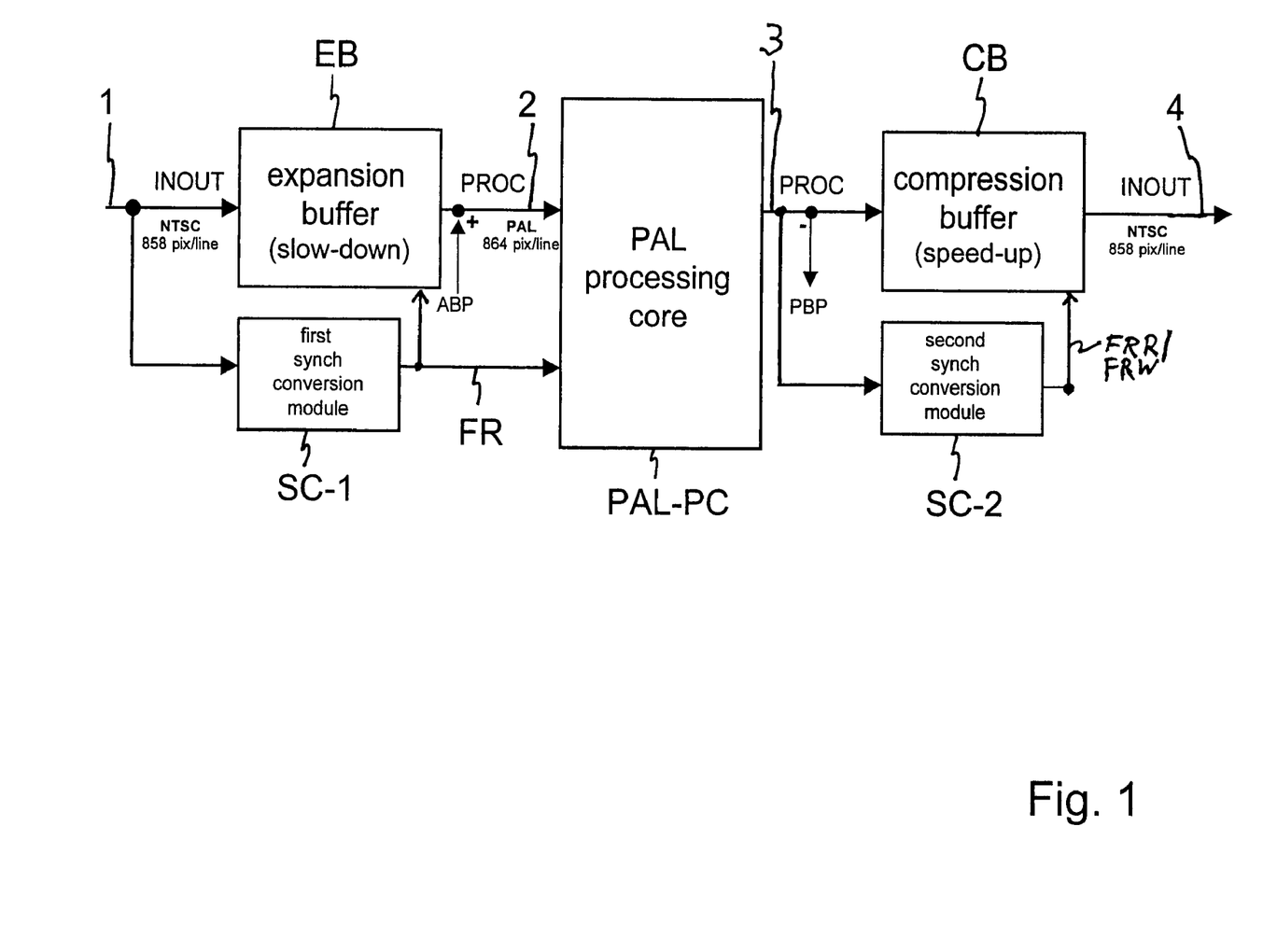
FIG. 1 shows the first embodiment of the invention where an NTSC input video signal is processed by a PAL video processing core.

In FIG. 1 an input video signal 1 is written into an expansion buffer EB. In the embodiment of FIG. 1, the above mentioned first embodiment, the input video signal is of the NTSC format. This means, 858 pixels per line are written into the expansion buffer EB. As soon as pixels from the input video signal 1 are written into the expansion buffer EB, a PAL processing core PAL-PC starts reading pixels from the expansion buffer EB. After the first line of the input video signal 1, i.e. an NTSC video line, has been written into the expansion buffer EB and read-out with the same pixel rate by the PAL processing core PAL-PC, six blank data pixels i.e. added blank pixels ABP are generated and added to the first NTSC video line. During the processing of these 6 blank data pixels by the PAL processing core PAL-PC pixels of the next NTSC input line arrive, i.e. more pixels are provided by the input video signal 1. These pixels, i.e. six pixels, are stored in the expansion buffer EB. After the PAL processing core PAL-PC has processed the first entire NTSC video line plus the six blank data pixels which have been added, the PAL processing core PAL-PC starts processing the next NTSC input line. This procedure of writing to/reading from the expansion buffer EB continues until a video field of the input video signal 1 has been written to the expansion buffer EB. Due to the unbalanced read/write ratio at the input of the expansion buffer EB and the output of the expansion buffer EB, respectively, the expansion buffer EB fills up during the processing of one video field. In particular, the expansion buffer EB fills up by 6 pixels for each arrived video line of the input video signal 1.

It should be noted again, that the invention is based on the assumption of an equal number of processed pixels per time instance, i.e. an equal pixel rate for both formats, i.e. here the PAL format, which is the processing format, and the input format, which here is the NTSC format. In the embodiment of FIG. 1, the source format NTSC has 858 pixels per line and 263 lines per field, which equals 225654 pixels per field. The core processing format, i.e. the PAL format, has 864 pixels per line. Thus, only 225654/864=261.1 lines per NTSC field will be processed. This includes all required 244 lines of active video in NTSC. Note, that not all data needs to be written. Only active video data can be written to the buffer, thus reducing the maximum buffer size, i.e. the maximum needed size of the buffer.

After one video field of the input video signal 1 has been written to the expansion buffer EB, an embedded synch signal, i.e. a field restart signal FR, is detected in the input video signal 1 by a first synch conversion module SC-1. The first synch conversion module SC-1 detects the field restart signal FR contained in the input video signal 1 and sends it to the PAL processing core PAL-PC and to the expansion buffer EB. As soon as the PAL processing core PAL-PC receives the field restart signal FR, the PAL processing core PAL-PC interrupts the processing of a current video field currently being processed and starts processing pixels from the following video field. The field restart signal FR also controls the writing component of the expansion buffer EB. The consequence is, that pixels remaining in the expansion buffer EB and belonging to the current video field are discarded. Discarding here can also mean that the remaining pixels in the expansion buffer EB are overwritten by new incoming data, i.e. pixels received via the input video signal 1.

The first synch conversion module SC-1 also translates the synch of the input video signal 1 into the processing synch pattern, i.e. the field restart signal of the processing format, here the PAL format, from which a field restart condition is derived, and controls the reading component of the expansion buffer EB. The field restart is synchronous to the INOUT (NTSC) format, thus the PAL case is interrupted in a premature manner.

At the output of the PAL processing core PAL-PC a processed video signal 3 is output. Each video line of the processed video signal 3 contains at the end of each line processed blank pixel PBP. In the embodiment of FIG. 1 these processed blank pixels PBP correspond to the six added blank pixels ABP. The processed blank pixels PBP are now removed from the processed video stream, i.e. the processed video signal 3. The remaining processed pixels are written to a compression buffer CB. At the output of the compression buffer CB an output video signal 4 is output. The output of the output video signal 4, however, does not start until the compression buffer CB contains a predetermined minimum number of pixels MNP. In the embodiment of FIG. 1 this minimum number of pixels MNP corresponds to the number of pixels contained in 1.8 video lines of the input video signal. During the time the compression buffer CB is filled with processed video pixels of the processed video signal 3 blank pixels will be output by the output video signal 4. The number of output blank pixels in the output video signal 4 is equal to the number of added blank pixels ABP per video field. In other words, all processed blank pixels PBP are output in a single block, i.e. sequentially. After the compression buffer CB is filled with the minimum number of pixels MNP, reading from the compression buffer CB starts in a FIFO-manner, i.e. pixels which have been stored in the buffer first are output first.

The second synch conversion module SC-2 does something similar as the first synch conversion module SC-1. The core processing module generates a new synch signal, which is embedded in the processed video signal 3. Here, the new synch signal controls the writing component of the compression buffer CB by a field restart write signal FRW. The second synch conversion module SC-2 also provides a field restart read signal FRR, which controls the reading component of the compression buffer CB. The output data stream of the compression buffer CB contains the new embedded synch signal, i.e. the field restart read signal FRR. This means, the field restart write signal FRW is synchronized with the processed video signal 3 of the intermediate format PROC, and the field restart read signal FRR is synchronized with the output video signal 4 of the NTSC format. Since it is generated by SC-2 it is guaranteed that the output data stream contains the field restart read signal FRR. Fact is that FRW causes FRR which are both caused by FR(SC-1). Thus all FR signals are synchronous to the IO format and not to the format PROC.

Figure 2:
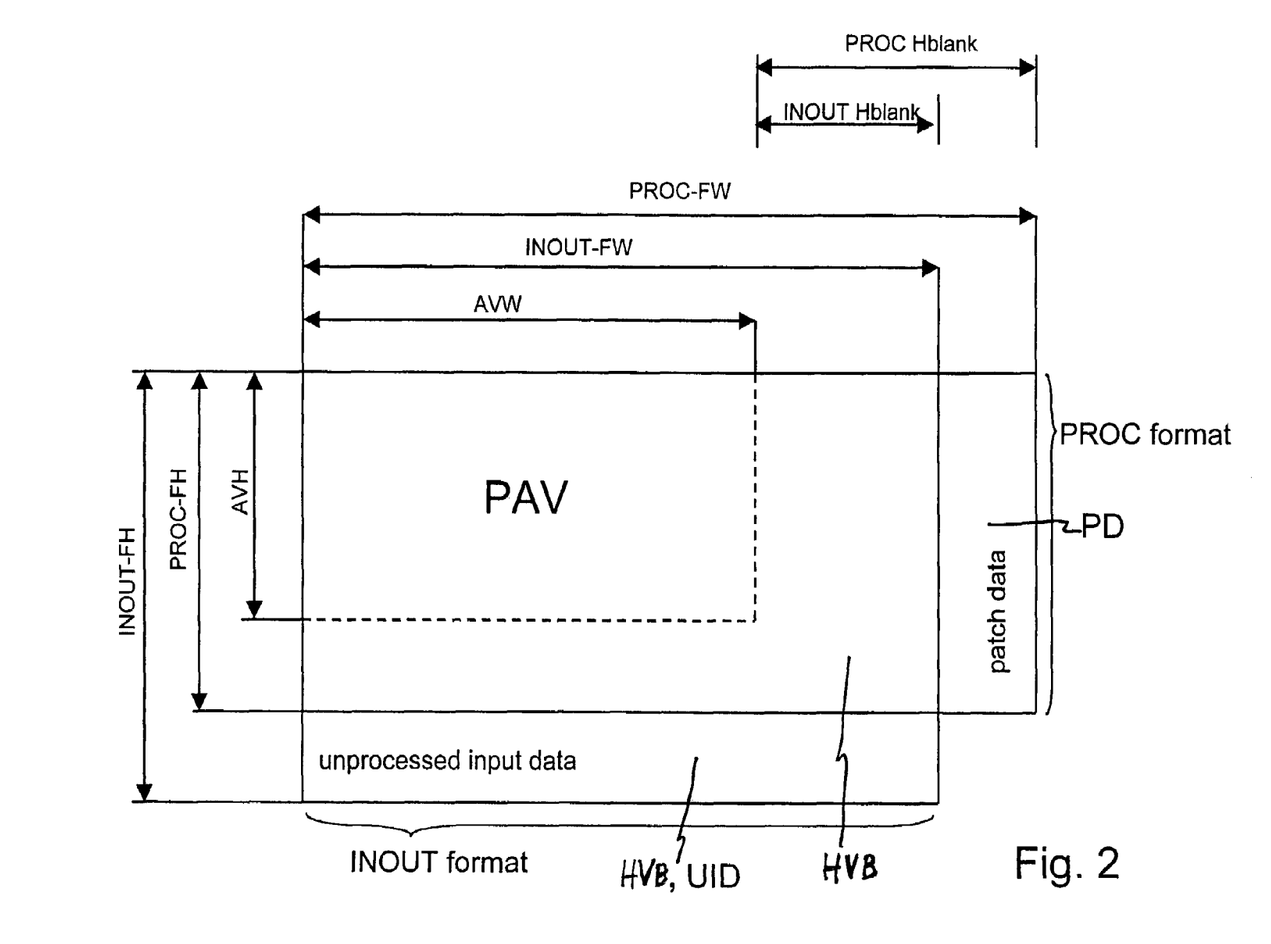
FIG. 2 shows a diagram illustrating the differences between the intermediate format and the first or input format.

FIG. 2 shows a diagram illustrating the differences between an input format INOUT and an intermediate format PROC. It should be emphasized that the intermediate format PROC is not a valid standard video format, i.e. with respect to FIG. 1, the intermediate format PROC is not a valid PAL signal and not a valid NTSC signal.

As can be seen in FIG. 2 the input format INOUT, in the first embodiment corresponding to the NTSC format, has an input format width INOUT-FW and an input format height INOUT-FH. The input format width INOUT-FW and the input format height INOUT-FH correspond to one video field of the input video signal of the input format INOUT, here the NTSC format. As can be seen, one video field of the input format INOUT contains active video data that corresponds to an active video width AVW and an active video height AVH. Further, a video field of the input format INOUT contains horizontal and vertical blanking information HVB, which is all the video data of the video field that is not active video. FIG. 2 also shows an intermediate Hblank data width PROC Hblank of the intermediate format PROC and an input/output Hblank data width INOUT Hblank of the input format INOUT. The input/output Hblank data width INOUT Hblank of the INOUT format plus a patch data width is equal to the intermediate Hblank data width PROC Hblank.

FIG. 2 also shows a video field of the intermediate format PROC. This intermediate format PROC has an intermediate format width PROC-FW and an intermediate format height PROC-FH. As can be seen, the intermediate format width PROC-FW is larger than the input format width INOUT-FW, and the intermediate format height PROC-FH is smaller than the input format height INOUT-FH. Each line of the intermediate format PROC contains a complete line of the input format INOUT plus patch data PD. In the first embodiment one line of the intermediate format PROC contains a complete NTSC video line corresponding to 858 pixels plus six pixels of patch data PD.

The video field in FIG. 2 corresponding to the intermediate format PROC is completely processed by the PAL processing core PAL-PC. As can be seen in FIG. 2, thus all active video contained in the field of the input video signal having the input format INOUT will be processed. Thus, the processed video signal 3 contains processed active video PAV that corresponds to active video of the input video signal that has been processed by the PAL processing core PAL-PC.

FIG. 2 also shows unprocessed input data UID, which corresponds to data of the input video signal 1 that is contained in the expansion buffer EB after one video field of the input video signal 1 has been received, i.e. written into the expansion buffer EB. After the processing of a video field of the intermediate format PROC the field restart signal FR is extracted from the input video signal 1 by the first synch conversion module SC-1 and a new video field of the input video signal 1 will be processed by the PAL processing core PAL-PC. However, as can be seen in FIG. 2 the unprocessed input data UID does not contain any active video data of the video field of the input video signal 1. In other words, the unprocessed input data UID only contains horizontal and vertical blanking information HVB of the input video signal 1. It is important to note that all active video of the input video signal 1 has been properly processed during one cycle, i.e. during the processing of one video field of the input video signal 1.

Figure 3:
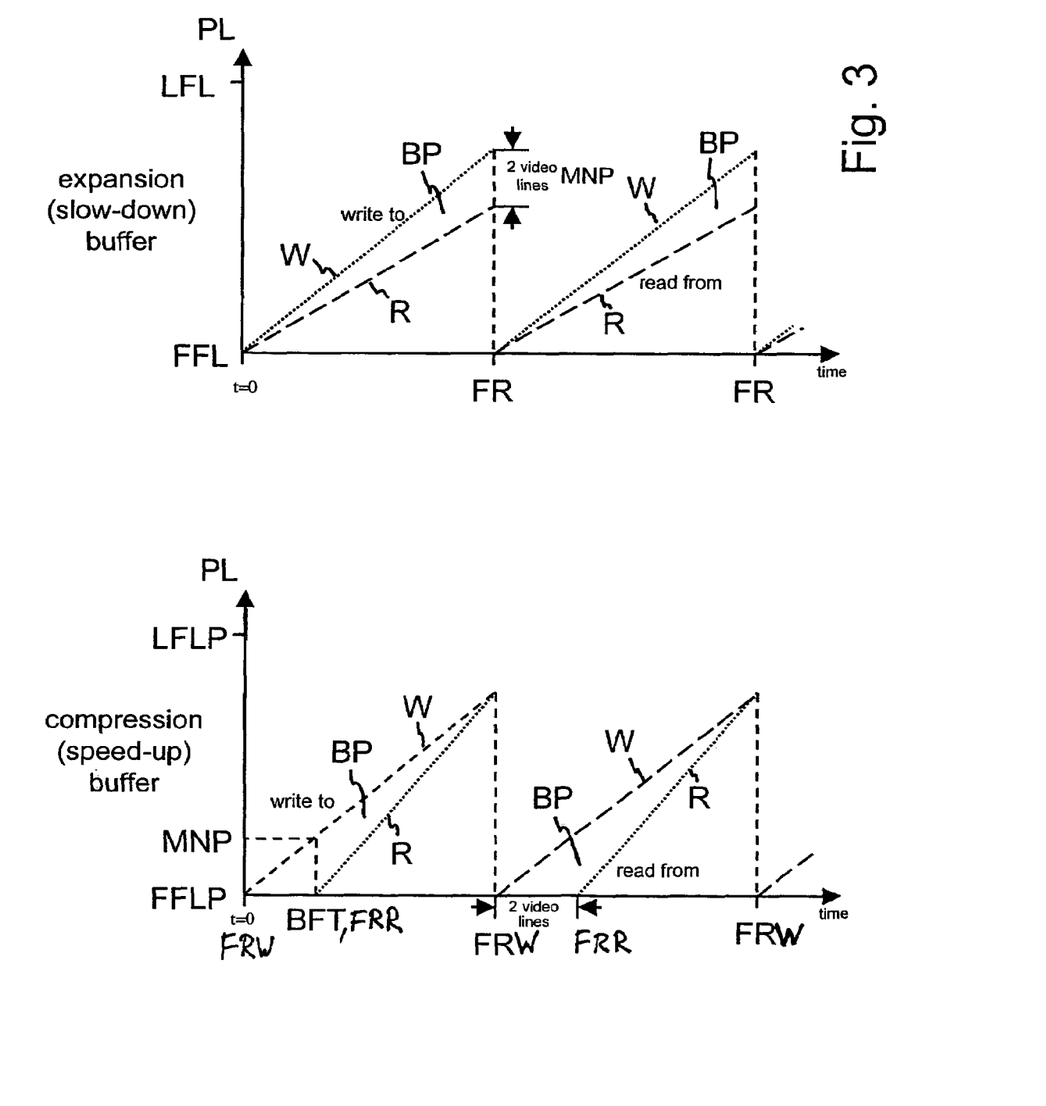
FIG. 3 illustrates the reading and writing from/to the expansion buffer, and the compression buffer, respectively.

FIG. 3 is still related to the first embodiment of the invention and shows in the upper part the writing and reading to/from the expansion buffer EB. The diagrams show progressed video lines PL over time. In the beginning, i.e. for t=0, the expansion buffer EB is empty. At t=0 the first field line of the input video signal 1, i.e. the first video line is an NTSC video line and will be processed by the PAL processing PAL-PC in real time, i.e. with the same pixel rate that pixels arrive with. Because of the same processing rate of the PAL processing core PAL-PC and the pixel arriving rate of the input video signal 1 during the processing of the first field line of the input video signal 1 no pixels need to be stored in the expansion buffer EB. After the processing of the first field line six added blank pixels ABP are inserted into the pixel stream at the end of the expansion buffer EB. During the insertion of these added blank pixels ABP new pixels arrive via the input video signal 1. Since the PAL processing core PAL-PC operates with the same pixel rate as the arrival pixel rate, during the processing of the second field line of the input video signal 1 six pixels will be stored in the expansion buffer EB. As can be seen in the upper part of FIG. 3, due to the unbalanced write/read ratio the expansion after EB will be filled and at the end of the processing of one video field of the input video signal 1 buffered pixels BP remain in the buffer, i.e. after a last field line LFL of the input video signal 1 has been written into the expansion buffer EB. After one video field of the input video signal 1 has been received, a field restart signal FR is received. Then, a new video field of the input video signal 1 will start to be processed. Therefore, the pixels that still remain in the buffer will be deleted. The number of pixels that remain in the buffer after the receiving of one video field is equal to the minimum number of pixels MNP. The minimum number of pixels MNP corresponds to the number of added blank pixels ABP per video field. The minimum number of pixels MNP can be calculated as follows: An NTSC field time unit, i.e. the number of pixels per NTSC video field is 858× 263 clocks, i.e. 263 source lines; this field time unit is equal to 858×263/864=261.1 processed video lines; this means, 263 source lines, i.e. video lines contained in the input video signal 1, are stored, but only 261.1 video lines, i.e. PROC lines, i.e. lines of the intermediate format are read by the PAL processing core PAL-PC. Therefore, roughly 2 lines remain in the buffer, which correspond to the minimum number of pixels MNP. The number of buffer lines, i.e. the number of video lines that remain in the expansion buffer EB at the end of one video field can be calculated by the following equation:

$$\frac{\sum_{number\_of\_input\_lines} line\_patch\_data}{PROC\_line\_length} = number\_of\_buffer\_lines \quad (1)$$

the variables denoting:
line_patch_data: the number of added blank pixels ABP per video line,
number_of_input_lines: the number of input lines of the video input signal 1 per video field.
PROC_line_length: the line length, i.e. the number of pixels per line of the intermediate format PROC,
number_of_buffer_lines: the number of lines remaining in the buffer after one video field has been received, i.e. after the restart signal FR has been received.

Equation (1) helps computing the buffer size when (a) storing an entire video line including a blank data or when (b) only storing active video.

If only active video is stored with 720 pixels per line, the buffer size can be reduced. The maximum needed size of the buffer, i.e. if 864 pixels are processed is given by:

1.82 lines×864 pix and 16 bit each=24.6 kbit per buffer (maximum).

and the minimum needed buffer size, i.e. when only active video is stored is given as follows:

1.82 lines×720 pix and 16 bit each=20.5 kbit per buffer (minimum).

Since per line only 720 pixels need to be stored by skipping Hblank data, only the number of lines to be stored (e.g. 1,82) multiplied by 720 instead of 864 pixels with 16 bit per pixel equals the needed buffer size. This reduces the buffer size requirements significantly.

The lower part of FIG. 3 shows the writing W and reading R to/from the compression buffer CB. At t=0 a first field line of processed video signal FFLP is written to the compression buffer CB. This is controlled by the field restart write signal FRW. Subsequently, further field lines of processed video signal are written to the compression buffer until the minimum number of pixels MNP has been written to the compression buffer CB corresponding to a buffer fill time BFT. At the buffer fill time BFT, reading R starts from the compression buffer CB. The reading is controlled by the field restart read signal FRR. Reading R starts at a higher rate such that the number of buffered pixels BP continually drops until the compression buffer CB is empty at the end of one video field, i.e. when a field restart write signal FRW is provided by the second synch conversion module SC-2. At this time the last field line of processed video signal LFLP has been read from the compression buffer CB. Note, that in the lower part of FIG. 3 writing and reading does not start synchronously as is the case in FIG. 3 upper part. In FIG. 3 lower part, when the buffer is empty, only blank pixels are put out until the next read restart pulse, i.e. the field restart read signal FRR, re-triggers the reading process. The blank pixels that are output, i.e. the blank lines, can be considered as all horizontal patch data being put out in a single block of about 1.8 lines of video.

Figure 4:
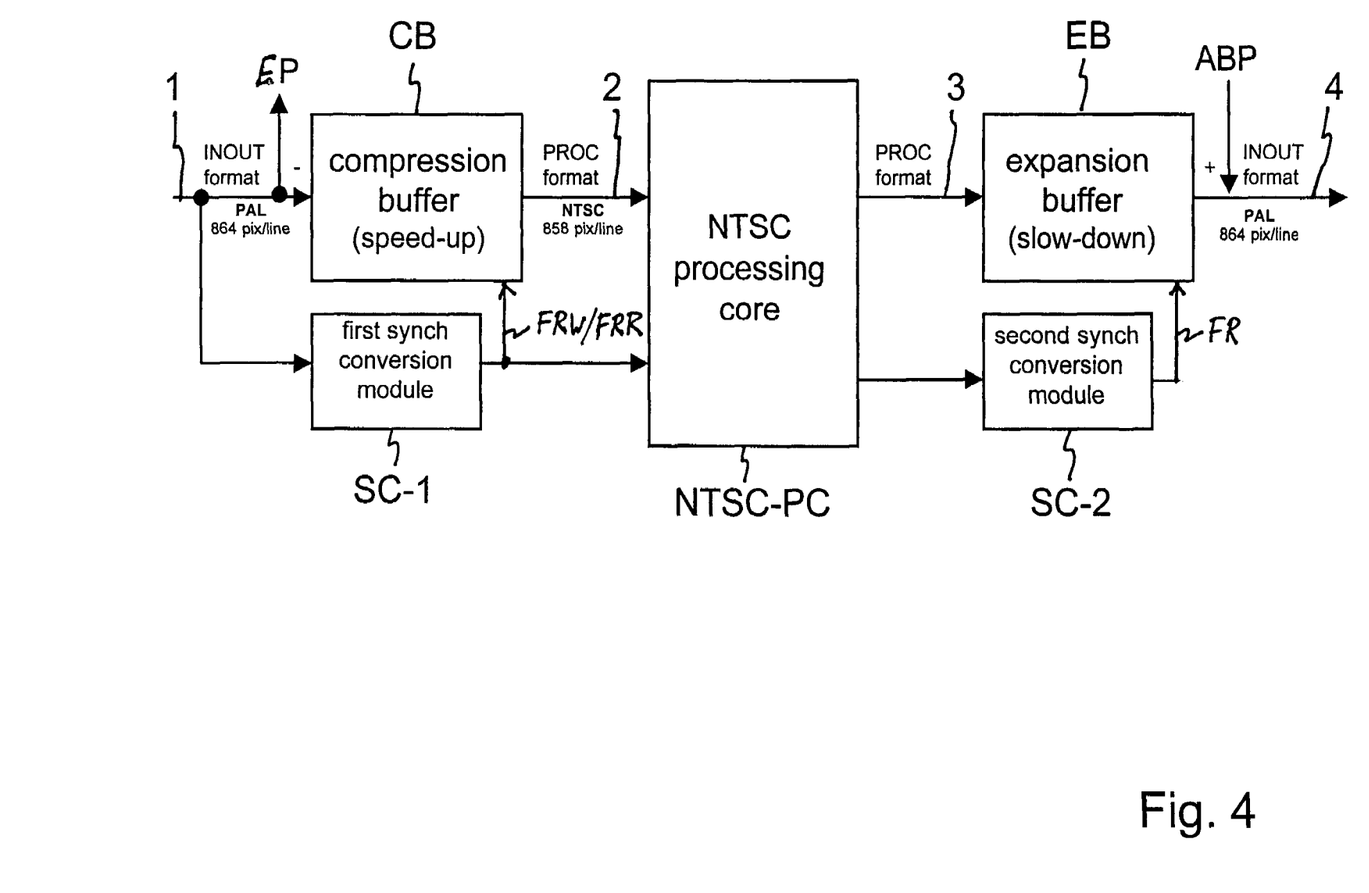
FIG. 4 shows the second embodiment of the invention where a PAL input video signal is processed by an NTSC video processing core.

FIG. 4 shows the second embodiment of the invention where an input video signal 1 of the PAL standard is received and the processing core is designed for processing NTSC format video signals, i.e. an NTSC processing core NTSC-PC. In this embodiment a compression buffer CB is used at the input of the NTSC processing core NTSC-PC. Before pixels of the video input signal 1 are stored in the compression buffer CB excess pixels EP are removed from the input video signal 1. This is because the input video signal 1 in this embodiment is of the PAL standard having 864 pixels per line whereas in this embodiment the intermediate format PROC only has 858 pixels per line which is equal to the number of pixels per line of the processing format, i.e. here the NTSC format. The excess pixels EP correspond to pixels of the Hblank and/or the Vblank period of the input video signal 1. Since in this embodiment reading of the NTSC processing core NTSC-PC from the compression buffer CB starts at a higher rate than writing to the compression buffer CB, no pixels are read from the compression buffer CB until a second minimum number of pixels 2MNP are stored in the buffer, i.e. the buffer is filled with the minimum number of pixels 2MNP.

Note, that the buffer size for the second embodiment is different from the needed buffer size in the first embodiment. The buffer size of the second embodiment, which is equal to the second minimum number of pixels 2MNP may also be calculated using formula (1) from above. In the case of the second embodiment, the needed buffer size for the compression buffer CB is equal to 2.18 video lines.

In FIG. 4, the first synch conversion module SC-1 detects a field restart signal contained in the input video signal 1 and provides this field restart signal as a field restart write signal FRW to the compression buffer CB. This means, the field restart write signal FRW is synchronous with the field restart signal of the input video signal 1 of the PAL format. The first synch conversion module SC-1 also provides a field restart read signal FRR, which is also synchronous to the field restart signal of the input/output or INOUT video signal 1 of the format INOUT. In other words, the first synch conversion module SC-1 provides the field restart write signal FRW and the field restart read signal FRR to the compression buffer CB in order to control the writing to reading from the compression buffer CB. As can be seen in FIG. 4, the field restart read signal FRR is also provided to the NTSC processing core NTSC-PC. Here, the field restart read signal FRR is used to control the field-wise processing of the NTSC processing core NTSC-PC.

It should be noted that the field restart write signal FRW and the field restart read signal FRR are used in an analogue way to the first embodiment of above. This means, the explanations of FIG. 3 lower part also apply here. As can be seen from FIG. 3 lower part, writing to the compression buffer CB starts when the first synch conversion module SC-1 provides the field restart write signal FRW at t=0, and reading does not start until the first synch conversion module SC-1 provides the field restart read signal FRR. This is the case when the compression buffer CB is filled with the second minimum number of pixels 2MNP. At the time the next field restart write signal FRW is provided by the first synch conversion module SC-1, the compression buffer CB will be empty. This is due to the higher rate for reading R pixels from the compression buffer CB than the rate for writing W to the compression buffer CB. As in the first embodiment, it is always assured that all active video will be processed by the NTSC processing core NTSC-PC.

At the output of the NTSC processing core NTSC-PC processed video pixels of the intermediate format PROC are written to the expansion buffer EB. As soon as pixels have been written to the expansion buffer EB pixels are output to yield the output video signal 4. However, reading starts with a lower rate, because at the end of each video line of the processed video signal 3 which is read from the expansion buffer EB blank pixels will be added, i.e. added blank pixels ABP. This way the output video signal 4 will have 864 pixels per line as is required for the PAL standard. At the end of a such generated video line, i.e. the pixels of a line of the processed video signal 3 plus the 6 added blank pixels ABP, the second synch conversion module SC-2 provides an according synch signal, i.e. a field restart signal FR. Thus, the output video signal 4 is a video signal completely conform with the PAL standard.

In the following further elucidations are provided that may help a person skilled in the art to get a better understanding of the invention.

A video image processing core module works for a specific image format which is mainly determined by the format width. By using expansion buffers (slow-down buffers) and compression buffers (speed-up buffers) at the respective inputs and outputs of the system, a format width conversion is achieved. To expand the width, data is patched into the data stream, whereas data is skipped from the stream to compress the image width. Thus, the interface format, i.e. the intermediate format, is matched to the processing core format. The invention does provide a simple method that uses relatively little memory and logic and is fully transparent to the core module's format.

The invention may be referred to as multi-format adaptation scheme and can be used in an ASIC as part of a commercial TV product. As already mentioned, with a relatively small amount of additional memory and logic added to the system, e.g. a respective ASIC, other formats, i.e. formats that are different from the formats the processing core, i.e. the system, is designed for, are added to the acceptable input/output format list without changing the core processing module. This relaxes the designer's requirements to evaluate and verify the core module for other formats. Only the format adaptation needs to be verified.

One advantage of the invention is that once a PAL processing core is designed, tested and verified, by only adding some small buffers at the interfaces, the NTSC processing capability is also given. Without the invention a processing algorithm which is comparable with both formats would be needed. However, keeping an implementation of such an algorithm generic in terms of format width, is very difficult and time consuming. Also, legacy implementations might not be available for other than one format. These problems do not arise when the invention is used, providing multiple format compatibility with low memory requirements.

According to the invention, in order to process an input image, e.g. 858 pixels wide which correspond to NTSC with a processing module designed for a different width, e.g. 864 pixels wide which correspond to PAL standard, the incoming image is stored into an expansion (slow-down) buffer. The width adaptation is done by reading the stored image data from the expansion (speed-up) buffer and adding additional patch data to the image to do the width conversion. The output of the processing module is then stored into a compression buffer where the reverse width adaptation is done by skipping the previously inserted patch data. This example describes the narrow input/output format with a wider core processing format, i.e. the first embodiment of the invention.

In the second embodiment of the invention the wider input/output format is first compressed (speed-up), processed in the narrow format and then expanded (slow-down).

In the first embodiment the maximum memory requirement of the compression buffer CB and the expansion buffer EB is 49.2 kbit buffer memory and is computed as follows:

With 261.1 lines of PAL processed data per 263 lines NTSC, roughly 1.82 lines of active video need to be stored at maximum in the expansion (slow-down) buffer. This is 1.82×864 pixels each 16 bit=24.6 kbit. That is, after one NTSC input field, the expansion buffer is filled.

The same amount of data needs to be stored into the compression (speed-up) buffer before read-out starts. That is, after one NTSC output field, the compression buffer is empty.

In the following the first embodiment will be explained in more detail. In this case an NTSC format is used as input video signal having 858 pixels per line, 262 or 263 lines, and 60 fields per second. The core module is designed for the PAL format having 864 pixels per line, 313 or 312 lines, and 50 fields per second.

The following points should be noted:

A processing core is designed to work on a specific line width, determined by the core format. The invention changes the INOUT format line length to match the processing format line length.

The number of lines per video field to be processed by the core is determined by a respective field restart signal (video synch signal) and not by core format line number. E.g. a PAL processing core can be interrupted and restarted before reaching 312 lines, whereas a NTSC processing core can process more than 262 lines.

The pixel rate of the INOUT format is identical to the pixel rate of the processing format.

The expansion and compression buffers are located around the core processing module as depicted in FIG. 1. This block diagram is a structural representation. The actual implementation merges the respective buffers with video memories inside the processing core. But processing core memory is not needed for the invention to work.

The PAL core processing format has 864 pixels per line and the NTSC I/O format has 858 pixels per line, which is 6 pixels difference. The NTSC data will be written into the expansion buffer. Reading the buffer starts immediately after writing starts, in order to keep the buffer size small and the latency of the system small. After writing/reading the first 858 pixels (one source video line), 6 blank pixels are patched into the intermediate format stream to complement a video line. Meanwhile, more source data is written into the expansion buffer. Due to the unbalanced write/read ratio, the buffer will fill up during one full field cycle.

The previous description is based on a full video line, which contains active video and also horizontal blanking data (Hblank). Writing the entire NTSC video line with 858 pixels is only needed, when the Hblank data needs to be transmitted through the system. If only the active video data is needed, merely 720 pixels per video line need to be stored. This Hblank data requirements thus affect the needed buffer depth, which computes as follows:

An NTSC field time unit is 858×263 clocks (=263 source lines).

This time unit is equal to 864×261.1 clocks (858×263/864=261.1 proc lines).

That means, 263 source lines are stored, but only 261.1 proc lines are read→roughly 2 lines remain in the buffer.

This is the sum of all patch data divided by the proc format line length:

$$\frac{\sum_{number\_of\_input\_lines} line\_patch\_data}{PROC\_line\_length} = number\_of\_buffer\_lines$$

Thus, the buffer stores roughly 2 (=1.82) video lines. If only active video is stored with 720 pixels per line, rather than the entire 864 pixels, the buffer size can be reduced.

1.82 lines×864 pix and 16 bit each=24.6 kbit per buffer (maximum).

1.82 lines×720 pix and 16 bit each=20.5 kbit per buffer (minimum).

As mentioned before, both formats, i.e. the input format INOUT and the intermediate format PROC have the same pixel rate. The "temporal field rate" and the "number of lines per field" are parameters in a respective format. With an equal field rate for both formats, wider fields mean fewer lines per field, or vice versa. The width of a field represents the active video component plus the horizontal blanking period. Also, with an equal number of lines per field for both formats, wider lines mean a lower field rate, respectively.

See FIG. 2 for a visualization. If a wider intermediate format assume, less lines of the INOUT format will be processed, given an equal field rate. In our preferred embodiment the overlapping area covers the entire active video of the INOUT format.

In our case, though NTSC has also fewer lines than PAL, but the field rate is higher. From the above calculation for the buffer depth, it can be seen that during an NTSC field, 260 lines of PAL converted video is processed. This is more than the minimum of 244 lines of active video in NTSC. Thus, the buffer depth can be reduced even, such that processing stops when 244 lines are processed.

On the output side of the processing core, the PAL signal has to be reformatted to match the INOUT format. Writing into the compression buffer starts, as soon as the processing module provides valid data. Then, when the compression buffer is filled, reading starts with a higher rate. For every 864 pixels being processed, 858 pixels are written and 6 pixels are discarded. When the entire buffer is empty the NTSC field has been written out. This concludes one full cycle.

FIG. 3 shows the utilization of the respective buffers. After one cycle the expansion buffer at the system input is filled and will be deleted when the next cycle starts. That is, new incoming data overwrites old data. On the other end the compression buffer at the system output needs to be filled, before reading of data can start. During this time, blank data will be put out to the INOUT format. This blank data can be considered as the entire patch data being sent in a single block. In the first embodiment, this is about 2 lines of video data.

Finally, it should be noted that the invention helps to save a lot of development time and reduces design risks by reusing an existing and already tested processing core design. The video signal processing core, i.e. the processing core design, used is not restricted to special functionality, but it can do video processing of any type.

REFERENCE SYMBOLS

1 Input video signal
2 modified video signal
3 processed video signal
4 output video signal
PROC intermediate format
INOUT first or input format
EP excess pixels
FR field restart signal
FRW field restart write signal
FRR field restart read signal
HVB horizontal and vertical blanking information
PAL-PC PAL processing core
NTSC-PC NTSC processing core
PD patch data
EB expansion buffer
CB compression buffer
ABP added blank pixels
PBP processed blank pixels
SC synch conversion module
SC-1 first synch conversion in module
SC-2 second synch conversion in module
INOUT-FW input format width
INOUT-FH input format height
PROC-FW intermediate format width
PROC-FH intermediate format height
PROC Hblank intermediate Hblank data width
INOUT Hblank input/output Hblank data width
BP buffered pixels
LFL last field line of input video signal
FFL first field line of input video signal
LFLP last field line of processed video signal
FFLP first field line of processed video signal
BFT buffer fill time
MNP minimum number of pixels
PL progressed lines

The invention claimed is:

1. A method for video signal processing, wherein the following steps are performed:

receiving an input video signal having a first or input format, said input format having a predetermined standard field rate;

processing a modified video signal, which is a derivative of said input video signal, using a video signal processing method, which is designed for processing video signals of a fixed second or processing format thus generating a processed video signal, wherein said processing of the modified video signal is performed with said predetermined standard field rate, and wherein said processed video signal and said modified video signal have said predetermined standard field rate; and outputting a derivative of said processed video signal as an output video signal, wherein said modified video signal is derived from said input video signal by adding or removing pixels to/from said input video signal, thereby obtaining said modified video signal with an intermediate format, if said first or input format does not conform to said fixed second or processing format, and wherein said output video signal is derived from said processed video signal by accordingly removing or adding pixels from/to said processed video signal thereby obtaining an output video signal of said first format, if said first or input format does not conform to said fixed second or processing format.

2. The method according to claim 1, wherein, said intermediate format is not a valid standard video format and is neither of the first or input format nor of the fixed second or processing format.

3. The method according to claim 1, wherein the number of lines of said intermediate format is equal to the number of pixels per video field of said first or input format divided by the number of pixels per video line of said second or processing format.

4. The method according to claim 1, wherein, said first or input format is a first standard video format and/or said fixed second or processing format is a second standard video format.

5. The method according to claim 1, wherein, when deriving said modified video signal from said input video signal pixels are added/removed so as to change the number of pixels per video line of said intermediate format with respect to said first or input format.

6. The method according to claim 4, wherein, pixels are added/removed to/from said input video signal such that the number of pixels per video line of said intermediate format is equal to the number of pixels per video line of said fixed second or processing format.

7. The method according to claim 1, wherein, when deriving said output video signal from said processed video signal said pixels are removed/added so as to change the number of pixels per video line of said output video signal with respect to said processed video signal.

8. The method according to claim 7, wherein, pixels are removed/added from/to said processed video signal such that the number of pixels per video line of said output video signal is equal to the number of pixels per video line of said first or input format.

9. The method according to claim 1, wherein, said video signal processing uses the field restart signal of said input video signal, such that said processing performed with said predetermined standard field rate.

10. The method according to claim 1, wherein, said video processing is performed by a video processing core, which is in particular adapted/designed for said fixed second or processing format.

11. The method according to claim 1, wherein, said first or input format is the NTSC video standard and said second or processing format is the PAL video standard.

12. The method according to claim 11, wherein, blank pixels are added at the end of an input video signal line thus obtaining said modified video signal having said intermediate format.

13. The method according to claim 11, wherein, pixels of said input video signal are stored in a first buffer and said processing reads pixels from said first buffer.

14. The method according to claim 11, wherein, processed pixels of said processed video signal which correspond to added pixels of said modified video signal are removed from said processed video signal thus obtaining said output video signal.

15. The method according to claim 11, wherein, pixels of said processed video signal are stored in a second buffer and said output video signal is generated by reading pixels from said second buffer.

16. The method according to claim 11, wherein, a first buffer and/or a second buffer are used having a capacity to at least store a minimum number of pixels, which is determined by the number of added pixels per video field of said input video signal.

17. The method according to claim 16, wherein, reading of pixels from said second buffer does not start until said second buffer is filled with at least said minimum number of pixels.

18. The method according to claim 16, wherein, reading of pixels from said second buffer does not start until a field restart signal is provided.

19. The method according to claim 1, wherein, said first or input format is the PAL video standard and said second or processing format is the NTSC video standard.

20. The method according to claim 19, wherein, pixels are removed at the end of an input video signal line thus obtaining said modified video signal having said intermediate format.

21. The method according to claim wherein, removed pixels correspond to pixels of the horizontal blanking period.

22. The method according to claim 19, wherein, pixels of said input video signal are stored in a second buffer and said processing reads pixels from said second buffer.

23. The method according to claim 19, wherein, blank pixels are added at the end of each video line of said processed video signal thus obtaining said output video signal of said first or input format.

24. The method according to claim 19, wherein, pixels of said processed video signal are stored in a first buffer and said output video signal is generated by reading pixels from said first buffer.

25. The method according to claim 19, wherein, a second buffer and/or a first buffer are used having a capacity to at least store a minimum number of pixels, which is equal to the number of pixels removed from said input video signal per video field.

26. The method according to claim 25, wherein, said processing does not start reading pixels from said second buffer until said second buffer is filled with at least said minimum number of pixels.

27. The method according to claim 25, wherein, said processing method does not start reading pixels from said second buffer until a field restart read signal is provided.

28. A signal processing system, which is capable of performing or realizing a method for signal processing according to claim 1 and/or the steps thereof.

29. The signal processing system according to claim 28, comprising:
 a receiving means adapted for receiving an input video signal;
 an adding/subtracting means adapted for adding/subtracting pixels to/from said input video signal thus generating a modified video signal having an intermediate format;
 a processing means designed for processing video signals of a fixed second or processing format, which processing means is adapted for processing said modified video signal, and thus generating a processed video signal;
 a subtracting/adding means adapted for subtracting/adding pixels from/to said processed video signal thus generating an output video signal of said first format; and
 an outputting means adapted for outputting said output video signal.

30. The signal processing system according to claim 28, wherein at least one storage means adapted for storing at least parts of said input video signal and/or at least parts of said processed video signal.

31. The signal processing system according to claim 28, wherein at least one synch conversion module adapted for detecting a synch signal in said input video signal and/or said processed video signal, and providing a field restart signal to a storage device, wherein said storage device is adapted for receiving said field restart signal, and using said field restart signal for controlling reading and/or writing from/to said storage device.

32. A computer readable storage medium, encoded with computer program instructions for causing a computer to implement the method comprising:
 receiving an input video signal having a first or input format, said input format having a predetermined standard field rate;
 processing a modified video signal, which is a derivative of said input video signal, using a video signal processing method, which is designed for processing video signals of a fixed second or processing format thus generating a processed video signal, wherein said processing of the modified video signal is performed with said predetermined standard field rate, and wherein said processed video signal and said modified video signal have said predetermined standard field rate; and outputting a derivative of said processed video signal as an output video signal;

wherein said modified video signal is derived from said input video signal by adding or removing pixels to/from said input video signal, thereby obtaining said modified video signal with an intermediate format, if said first or input format does not conform to said fixed second or processing format; and wherein said output video signal is derived from said processed video signal by accordingly removing or adding pixels from/to said processed video signal thereby obtaining an output video signal of said first format, if said first or input format does not conform to said fixed second or processing format.

33. The method according to claim 1, wherein the pixels added or removed to/from said input video signal and removed or added from/to said processed video signal are blank pixels.

* * * * *